United States Patent [19]
Jingu

[11] Patent Number: 5,913,297
[45] Date of Patent: Jun. 22, 1999

[54] INTERNAL COMBUSTION ENGINE

[75] Inventor: Nobuhisa Jingu, Kanagawa, Japan

[73] Assignee: Nissan Motor Co., Inc., Yokohama, Japan

[21] Appl. No.: 09/084,116

[22] Filed: May 26, 1998

[30] Foreign Application Priority Data

May 27, 1997 [JP] Japan .................................. 9-137101

[51] Int. Cl.⁶ .................................................. F02B 31/00
[52] U.S. Cl. ..................... 123/295; 123/308; 123/188.14
[58] Field of Search ................................. 123/294, 295, 123/308, 188.14, 305, 302

[56] References Cited

U.S. PATENT DOCUMENTS

| | | | |
|---|---|---|---|
| 4,702,203 | 10/1987 | Ohmi et al. | 123/302 |
| 4,805,569 | 2/1989 | Suzumura et al. | 123/188.14 |
| 4,809,647 | 3/1989 | Masumoto et al. | 123/302 |
| 5,233,956 | 8/1993 | Ueda et al. | 123/305 |
| 5,357,925 | 10/1994 | Sasaki | 123/298 |
| 5,676,107 | 10/1997 | Yuzuriha et al. | 123/302 |
| 5,762,042 | 6/1998 | Yoshikawa et al. | 123/188.14 |

FOREIGN PATENT DOCUMENTS 7-25236  5/1995  Japan .

*Primary Examiner*—Erick R. Solis
*Attorney, Agent, or Firm*—Foley & Lardner

[57] ABSTRACT

A cylinder direct injection spark-ignition internal combustion engine. The engine comprises a cylinder block having a plurality of cylinders. A cylinder head is fixedly mounted on a block deck of the cylinder block. The cylinder head has an intake port for each cylinder. The intake port has first and second sections which are contiguous with each other. The first section is located downstream of the second section relative to the flow of intake air. The first and second sections have respectively first and second axes. The first and second axes incline relative to a bottom flat surface of the cylinder head respectively to form first and second angles, in which the first angle is smaller than the second angle. A fuel injector valve is provided to directly inject fuel into a combustion chamber formed corresponding to each cylinder. The fuel injector valve is located close to the intake port and disposed closer to a periphery of the combustion chamber than a downstream end of the intake port. A spark plug is provided in such a manner that its tip end section is projected into the combustion chamber.

19 Claims, 5 Drawing Sheets

INTERNAL COMBUSTION ENGINE

The contents of Japanese Patent Application No. 9-137101, with a filing date of May 27, 1997 in Japan, are hereby incorporated by reference.

BACKGROUND OF THE INVENTION

1. Field of the Invention

This invention relates to improvements in an internal combustion engine, and more particularly to the improvements in the shape of an intake port of the engine.

2. Description of the Prior Art

In conventional internal combustion engines, an intake port is formed in a cylinder head and shaped such that its downstream section (at a combustion chamber side) is gently inclined relative to the bottom flat surface of the cylinder head while its upstream section (at an intake pipe side) is further gently inclined to be generally horizontal relative to the bottom flat surface, as disclosed, for example, in Japanese Utility Model Provisional Publication No. 7-25236.

Now, when the inclination angle of the intake port relative to the cylinder head bottom flat surface is relatively large, the intake port is called a "high port". When the inclination angle of the intake port is relatively small, the intake port is called a "low port". If the intake port extends generally parallel with the cylinder head bottom flat surface, the intake port is called a "horizontal port". In this connection, conventional general intake ports are arranged such that the downstream section takes the "low port" construction while the upstream section takes the "horizontal port" construction.

However, drawbacks have been encountered in an engine provided with such conventional intake port arrangements. That is, the downstream section of the "low port" construction is advantageous from the viewpoint of increasing an amount of intake air directed to an exhaust valve in a cylinder thereby enhancing tumble flow of intake air in the cylinder. However, it is required to ensure a sufficient length of intake air passage within a limited space in an automotive vehicle for the purpose of obtaining a sufficient engine torque output. When the upstream section takes the "horizontal port" or "low port" construction, this requirement is met by sharply bending the intake pipe (intake manifold) connected to the upstream section of the intake port such so that the radius of curvature of the intake pipe becomes small, or otherwise by forming a plurality of bent portions. These unavoidably increase intake air flow resistance and provide troubles in layout of the intake pipe on the automotive vehicle.

Further, in cylinder direct injection spark ignition engines in which fuel is injected from a fuel injector valve directly into a combustion engine, it is preferable that the fuel injector valve is disposed close to the intake port and located closer to the periphery of the combustion chamber than the downstream end of the intake port. Particularly when the cylinder direct injection spark ignition engine is provided with two intake ports for each cylinder, it is preferable to dispose the fuel injector valve between the two intake ports. However, these concerns cause problems in which an accommodation hole for the fuel injector valve will interfere with the intake port upstream section of the "horizontal port" or "low port" construction, thereby making it difficult to dispose the fuel injector valve.

BRIEF SUMMARY OF THE INVENTION

It is an object of the present invention to provide an improved internal combustion engine which can effectively overcome drawbacks encountered in conventional internal combustion engines.

Another object of the present invention is to provide an improved internal combustion engine which can obtain a sufficient length of an intake pipe (intake manifold) while enhancing tumble flow of intake air in a cylinder.

A further object of the present invention is to provide an improved internal combustion engine which can facilitate disposition of a fuel injector valve and machining a fuel injector valve accommodating hole, when the engine is of a cylinder direct injection spark-ignition type.

An aspect of the present invention resides in an internal combustion engine comprising a cylinder head having an intake port. The intake port has first and second sections which are contiguous with each other. The first section is located downstream of the second section relative to the flow of intake air. The first and second sections have respectively first and second axes. The first and second axes incline relative to a bottom flat surface of the cylinder head respectively to form first and second angles, in which the first angle is smaller than the second angle.

Another aspect of the present invention resides in a cylinder direct injection spark-ignition engine. The engine comprises a cylinder block having a plurality of cylinders. A cylinder head is fixedly mounted on a block deck of the cylinder block. The cylinder head-has an intake port for each cylinder. The intake port has first and second sections which are contiguous with each other. The first section is located downstream of the second section relative to the flow of intake air. The first and second sections have respectively first and second axes. The first and second axes incline relative to a bottom flat surface of the cylinder head respectively to form first and second angles, in which the first angle is smaller than the second angle. A fuel injector valve is provided to directly inject fuel into a combustion chamber formed corresponding to each cylinder. The fuel injector valve is located close to the intake port and disposed closer to a periphery of the combustion chamber than a downstream end of the intake port. A spark plug is provided in such a manner that its tip end section is projected into the combustion chamber.

With the thus arranged internal combustion engine, the first or downstream-side section of the intake port takes the "low port" construction, and therefore tumble flow of intake air in the cylinder is enhanced thereby increasing the combustion speed of the air-fuel mixture in the combustion chamber thus improving combustion performance of the engine. Additionally, the second or upstream-side section of the intake port takes the "high port" construction, and therefore a sufficient length of the intake port can be ensured while ensuring a sufficient length of an intake pipe (intake manifold) merely by gently bending the intake pipe with a relatively large radius of curvature. Further, in a cylinder direct injection spark-ignition engine, a fuel injector valve and an accommodation hole for the fuel injector valve can be effectively prevented from interfering with the intake port by virtue of the fact that the upstream-side section of the intake port takes the "high port" construction.

DETAILED DESCRIPTION OF THE INVENTION

Figure 1:
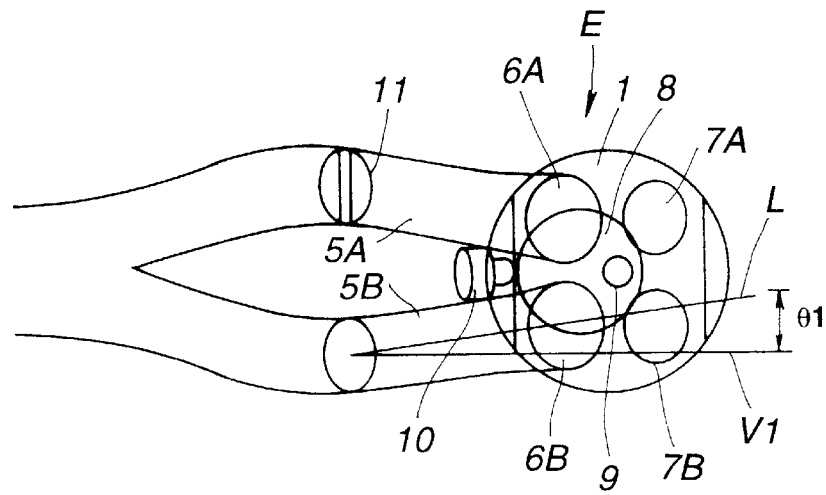
FIG. 1 is a fragmentary schematic plan view of an embodiment of a cylinder direct injection spark-ignition internal combustion engine according to the present invention.
Figure 2:
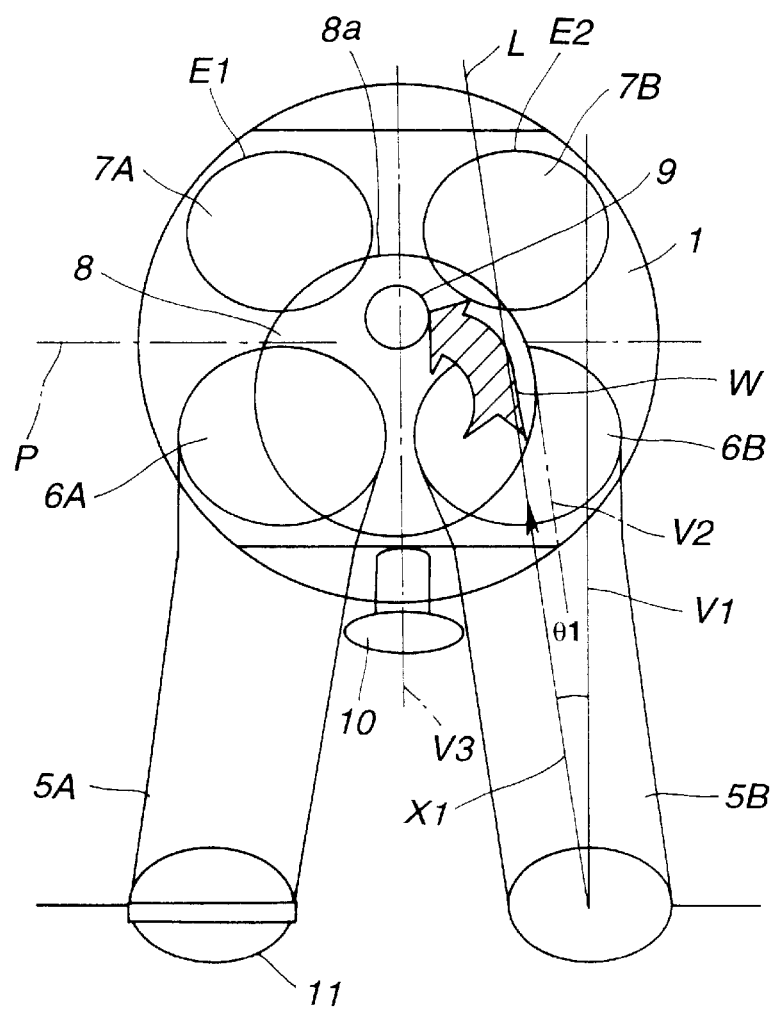
FIG. 2 is an enlarged fragmentary schematic plan view of the engine of FIG. 1.
Figure 3:
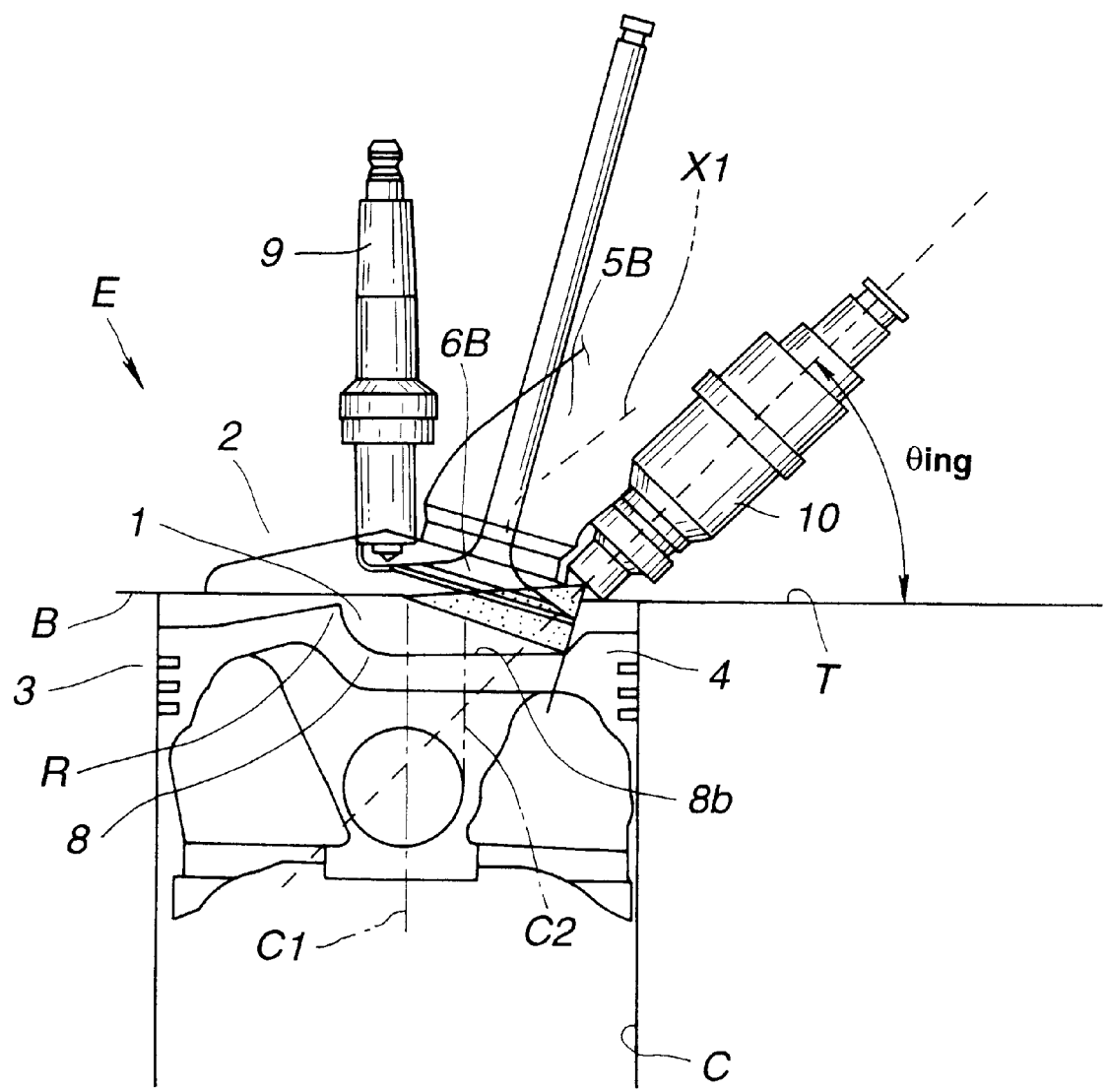
FIG. 3 is an enlarged fragmentary schematic vertical sectional view of the engine of FIG. 1.
Figure 4:
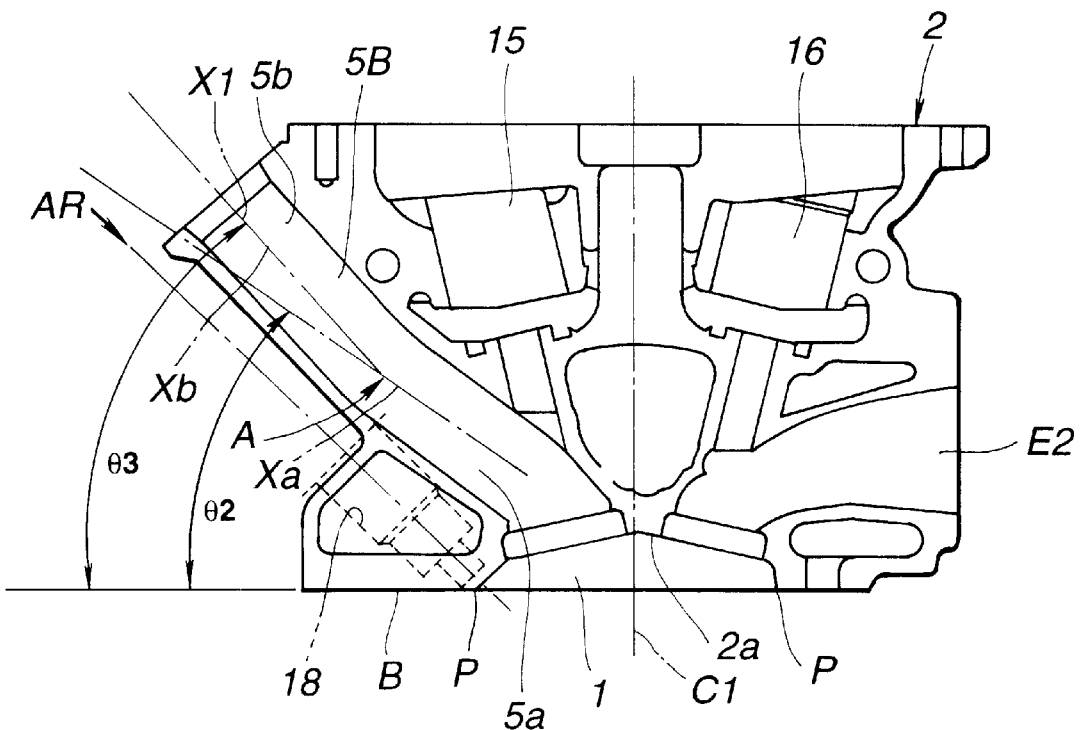
FIG. 4 is a vertical sectional view of a cylinder head of the engine of FIG. 1.
Figure 5:
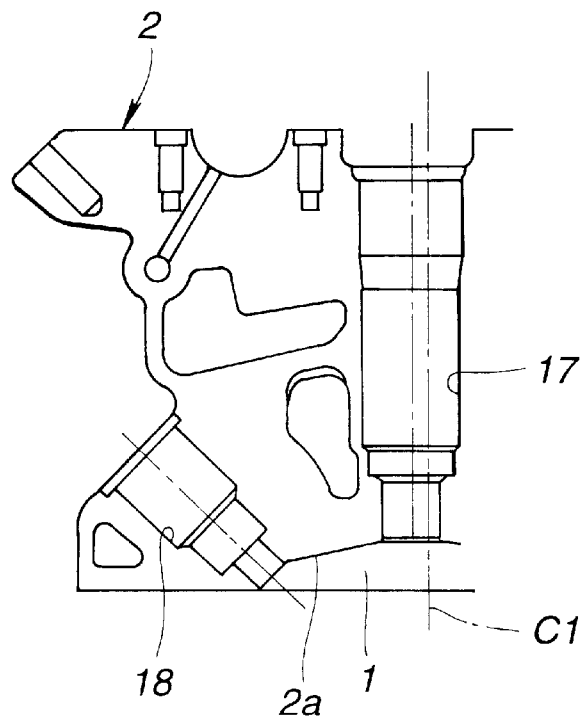
FIG. 5 is a fragmentary vertical sectional view of the cylinder head of FIG. 4, taken along an axis of a fuel injector valve accommodating hole in the cylinder head.

Referring now to FIGS. 1 to 7, more specifically to FIGS. 1 to 3, of the drawings, an embodiment of a cylinder direction injection spark-ignition (gasoline-fueled) internal combustion engine according to the present invention is illustrated by the reference character E. The engine E of this embodiment is for an automotive vehicle and has a plurality of engine cylinders C formed in a cylinder block 3 though only one cylinder C is shown. A piston 4 is movably disposed in each cylinder C to define a combustion chamber 1 between it and a cylinder head 2 which is secured at its bottom flat surface B to the block deck (cylinder upper-deck) or top flat surface T of the cylinder block 3.

The cylinder head 2 is formed with two (first and second) intake ports 5A, 5B and two exhaust ports E1, E2 (shown in FIG. 2) for each cylinder C or for each combustion chamber 1. The two intake ports 5A, 5B are located at an opposite side of a vertical cylinder head plane P with respect to the two exhaust ports E1, E2, in which the vertical cylinder head plane P contains the center axes (not shown) of the cylinders C. The intake ports 5A, 5B have respectively downstream ends (opened to the combustion chamber 1) at which two intake valves 6A, 6B are respectively movably disposed. The exhaust ports E1, E2 have respectively upstream ends (opened to the combustion chamber 1) at which two exhaust valves 7A, 7B are respectively movably disposed.

The piston 4 is formed at its piston crown with a circular cavity or depression 8 forming part of the combustion chamber 1. More specifically, the cavity 8 is formed at the top surface of the piston crown and shallow or flat so that its bottom surface 8b is generally flat. The center axis C2 of the cavity 8 is generally parallel with and offset from the center axis C1 of the piston 4 toward the intake valves 6A, 6B, i.e., located closer to the intake valves 6A, 6B than to the exhaust valves 7A, 7B. The periphery 8a of the cavity 8 is generally circular as viewed from the above as seen in FIG. 2. A part of the periphery 8a of the cavity 8 is raised over the other part of the periphery 8a to form a ridgeline R as shown in FIG. 3, the part being located at an opposite side of an imaginary vertical plane (not shown) containing the center axis C2, with respect to a side in which a fuel injector valve 10 is located.

A spark plug 9 is installed to the cylinder head 2 so that its tip end section (having electrodes) projects into the combustion chamber 1 and located above a part of the peripheral annular portion of the circular cavity 8. The spark plug 9 is positioned generally along the center axis C1 of the cylinder C. Specifically, the axis of the spark plug 9 is slightly offset from the center axis C1 of the cylinder C toward the exhaust valves 7A, 7B.

The fuel injector valve 10 is disposed between the first and second intake ports 5A, 5B as viewed from the above as shown in FIG. 2 and positioned to inject fuel (gasoline) directly into the combustion chamber 1. The fuel injector valve 10 is installed to be directed obliquely downward and extends in a direction from the intake valves 6A, 6B to the exhaust valves 7A, 7B. Specifically, the fuel injector valve 10 is positioned such that its axis (indicated by a dotted line) forms a predetermined angle $\theta inj$ relative to the top flat surface T of the cylinder block 3 (or relative to the bottom flat surface of the cylinder head 2) and is directed to the bottom surface 8b of the cavity 8. The predetermined angle $\theta inj$ is within a range of from 35 degrees to 45 degrees, preferably about 45 degrees. Accordingly, the fuel injector valve 10 injects fuel in an obliquely downward direction or toward the cavity 8. The fuel injector valve 10 is arranged to inject fuel at a fuel injection timing which is set, in this embodiment, during the compression stroke under the engine operating condition in which stratified charge combustion is to be carried out.

A swirl control valve 11 is movably disposed to block the first intake port 5A and arranged to be controllably opened or closed in accordance with an engine operating condition. In this embodiment, the swirl control valve 11 is controlled to be generally fully closed, in a predetermined engine operating condition in which stratified charge combustion is to be carried out. The swirl control valve 11 may be partly closed to control air flow in the first intake port 5A in another predetermined engine operating condition. The second intake port 5B is formed extending generally tangentially to the periphery 8a of the cavity 8. More specifically, a vertical port axis plane L containing the axis X1 (or at least a major part of the axis X1) of the second intake port 5B is inclined relative to a vertical cross flow plane V1 in a manner to gradually approach the center axis C1 of the piston 4 in a direction toward the combustion chamber 1, in which a predetermined angle (port inwardly directing angle) $\theta 1$ is formed between the vertical port axis plane L and the vertical cross flow plane V1. The predetermined angle $\theta 1$ is within a range of not smaller than 5 degrees and smaller than 15 degrees, preferably about 8 degrees. Additionally, the vertical port axis plane L is generally parallel with a vertical plane V2 containing a tangent line of the periphery 8a of the circular cavity 8 on an imaginary horizontal plane or the block deck of the cylinder block 3. In this embodiment, the vertical port axis plane L is located inside the vertical plane V2 and extends passing through a space outside the spark plug 9 and inside relative to the periphery 8a of the circular cavity 8. It will be understood that the vertical port axis plane L, the vertical cross flow plane V1, and the vertical plane V2 are vertical to the block deck or top flat surface T of the cylinder block 3. The vertical cross flow plane V1 passes through the intake valve 6B and the exhaust valve 7B and is perpendicular to the cylinder axis plane P which contains the axes of the cylinders C. It will be understood that the cylinder axis plane P is vertical to the block deck.

Thus, in other words, the predetermined angle θ1 is an angle of inward inclination of the intake port 5B (more specifically, the intake port axis X1) relative to a cross-flow horizontal direction V1. In a multi-cylinder engine, the predetermined angle θ1 may also be defined as a horizontally measured angle formed between the intake port axis X1 and a line V1, where the line V1 is in a vertical plane that both extends through an intake valve 6B and an exhaust valve 7B and is perpendicular to the vertical cylinder axis plane P containing the center axes of the adjacent cylinders.

With the above arrangement, the swirl control valve 11 is closed under an engine operating condition (for example, a low load engine operating condition) in which stratified charge combustion is to be carried out. Consequently, intake air is introduced through the second intake port 5B into the combustion chamber 1, in which intake air generates gas flow W in the form of swirl as shown in FIG. 2. The gas flow W is inside the cavity 8 formed at the piston crown and moves along the periphery 8a of the cavity 8.

It is to be noted that the first intake port 5A blockable with the swirl control valve 11 is formed and shaped generally symmetrical to the second intake port 5B with respect to a vertical central plane V3 which contains the center axis C2 of the cavity 8 and the center axis C1 of the piston 4 and parallel with the vertical cross flow plane V1, so that the axes of the first; and second intake ports 5A, 5B gradually approach to each other in the direction toward the combustion chamber 1 as clearly shown in FIG. 2. As illustrated, the tip end (having the electrodes) of the spark plug 9 is located inside relative to the vertical port axis plane L containing the axis X1 of the second intake port 5B. In this embodiment, the spark plug 9 is positioned such that the vertical central plane V3 passes through the tip end section of the spark plug 9.

As clearly illustrated in FIGS. 4 to 7, the cylinder head 2 is formed at the bottom flat surface B with a depression 2a forming part of the combustion chamber 1. The depression or combustion chamber 2a is located at the generally central part in a widthwgise direction (or in a right and left direction in FIG. 4) of the cylinder head 1. Reference numerals 15, 16 denote respectively holes for accommodating the intake and exhaust valves 6B, 7B. A spark plug accommodating hole 17 is formed in the cylinder head 1 to be located such that its axis is parallel with and close to the center axis C1 of the cylinder C. The spark plug 9 is to be accommodated in the hole 17.

A fuel injector valve accommodating hole 18 is formed in the cylinder head 2 and located near the intake ports 5A, 5B. More specifically, the fuel injector valve accommodating hole 18 is located between the two intake ports 5A, 5B as viewed from an upper side or on a horizontal plane containing the bottom flat surface B of the cylinder head 1. The bottom flat surface B is in tight contact with the top flat surface T of the cylinder block 3. The tip end section of the fuel injector valve accommodating hole 18 is located close to the periphery 8a of the combustion chamber 1 or the cylinder C. The fuel injector valve 10 is accommodated in this hole 18 in such a manner as to directly inject fuel obliquely downward into the combustion chamber 1. The fuel injector valve 10 is adapted to inject fuel at an injection timing in the intake stroke during homogeneous charge combustion, and at an injection timing in the compression stroke during stratified charge combustion.

Here, each intake port 5A, 5B is formed to be directed obliquely downward relative to the combustion chamber 1. The intake port 5A, 5B includes a downstream-side section 5a and an upstream-side section 5b which are contiguous with each other. The downstream-side section 5a is located between the combustion chamber 1 and the upstream-side section 5b, while the upstream-side section 5b is located between the downstream-side section 5a and an intake pipe 19 (in FIG. 6). The intake port 5A, 5B has its axis X1 which includes a downstream-side axis portion Xa, and an upstream-side axis portion Xb. The downstream-side axis portion Xa serves as the axis of the downstream-side section 5a of the intake port, and the upstream-side axis portion Xb serves as the axis of the upstream-side section 5b of the intake port 5A, 5B. The downstream-side and upstream-side axis portions Xa, Xb are connected with each other at a point A. The downstream-side axis portion Xa inclines relative to the bottom flat surface B of the cylinder head 1 to form a predetermined angle (inclination angle) θ2. The upstream-side axis portion Xb inclines relative to the bottom flat surface B to form a predetermined angle θ3 which is larger than the predetermined angle θ2 (i.e., θ2<θ3). Thus, the downstream-side section 5a takes a so-called "low port" construction having a relatively small inclination angle, while the upstream-side section 5b takes a "high port" construction having a relatively large inclination angle. The downstream-side section 5a has a length larger than that of the upstream-side section 5b.

Figure 6:
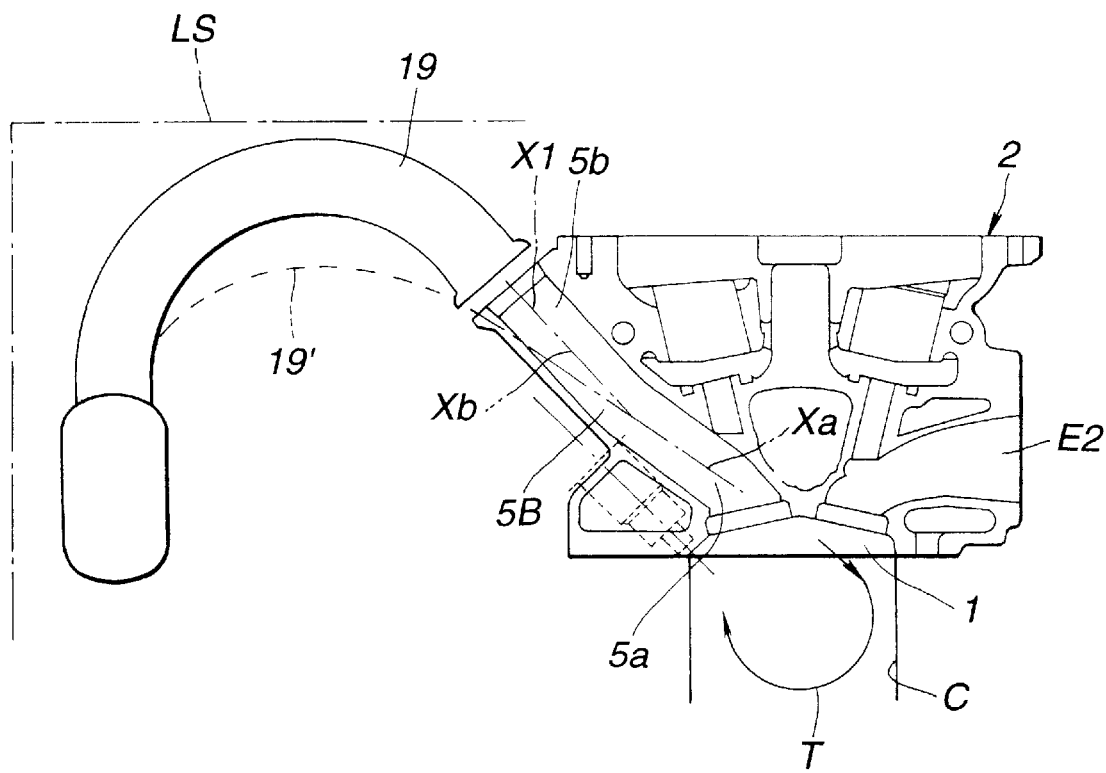
FIG. 6 is a vertical sectional view of the cylinder head of FIG. 4, showing a state where an intake pipe is installed to the cylinder head.
Figure 7:
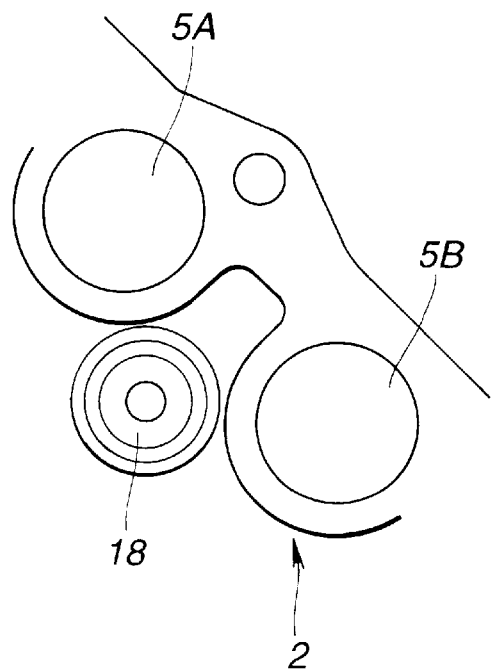
FIG. 7 is an enlarged fragmentary plan view showing the locational relationship between the fuel injector valve accommodating hole and an upstream-section of an intake port in connection with the cylinder head of FIG. 4, as viewed from a direction of an arrow AR in FIG. 4.

As shown in FIG. 6, the intake pipe or intake manifold 19 is connected to the upstream-side sections 5b, 5b of the intake ports 5A, 5B and arranged in such a manner as to be extended obliquely upward and then smoothly bend downward. The intake pipe 19 defines thereinside an intake air passage through which intake air flows to be introduced into the combustion chamber 1 or the cylinder C. By virtue of the upstream-side section 5b of the high port construction, the intake pipe 19 can ensure its necessary passage length even within a limited space LS for mounting the engine E on an automotive vehicle.

Next, operation of the thus arranged cylinder direct injection spark-ignition internal combustion engine E will be discussed.

Figure 9:
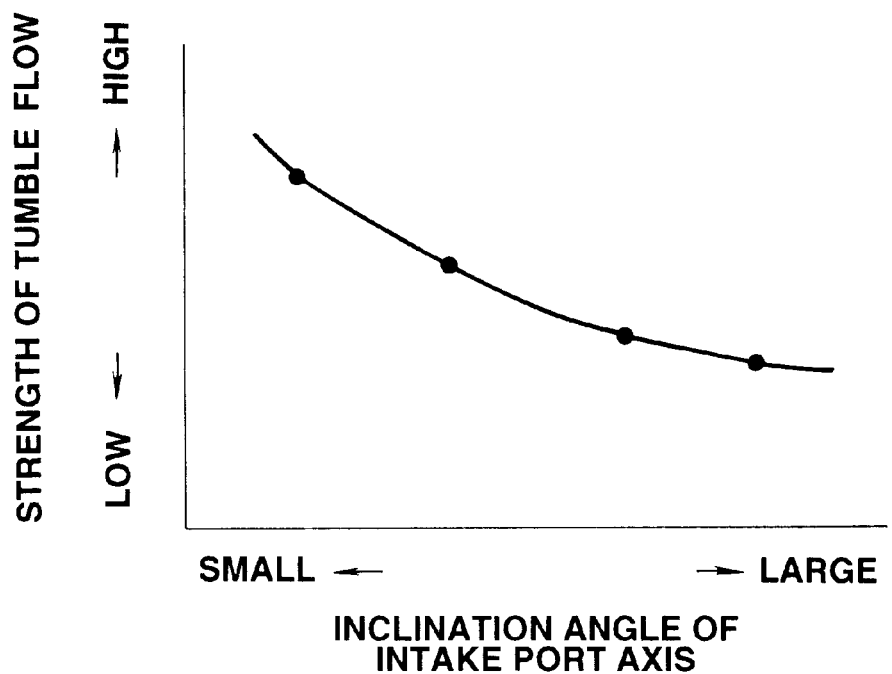
FIG. 9 is a graph showing the experimentally obtained data of the strength of tumble flow generated in the cylinder of a cylinder direct injection spark-ignition internal combustion engine, in terms of the inclination angle of the axis of an intake port of the engine.

In the intake stroke in the cylinder C, intake air flows through the intake ports 5A, 5B into the cylinder C or the combustion chamber. At this time, by virtue of the fact that the downstream-side section 5a of each intake port 5A, 5B takes the low port construction, the amount of intake air flowing to the side of the exhaust valves E1, E2 in the cylinder C increases thereby enhancing tumble flow T of intake air in the cylinder C as shown in FIG. 6. In this regard, FIG. 9 depicts a tendency that the tumble flow is enhanced as the inclination angle of the axis of the intake port relative to the bottom flat surface B of the cylinder head 1 decreases. The graph of FIG. 9 was obtained by conducting experiments on a cylinder direct injection spark-ignition engine similar to that shown in FIGS. 1 to 7 with the exception that the axis of the intake port was generally straight. In the experiments, the inclination angle of the axis of the intake port was varied to measure strength of the tumble flow.

Under the effect of the thus enhanced tumble flow of intake air, combustion speed of the air-fuel mixture inside the cylinder C can be effectively increased thereby improving combustion performance of the engine E.

Additionally, by virtue of the fact that the downstream-side section 5a of the intake port 5A, 5B is longer than the upstream-side section 5b, the tumble stream inside the cylinder C can be sufficiently enhanced.

Since the upstream-side section 5b of the intake port 5A, 5B takes the high port construction, a sufficient length of the intake port 5A, 5B can be ensured while ensuring a sufficient length of the intake air passage of the intake pipe or intake manifold 19 merely by gently bending the intake pipe 19 within the limited space LS in the automotive vehicle. In other words, the intake pipe 19 connected to the intake port is first upwardly extended and then gently bent downwardly gradually and smoothly with a relatively large radius of curvature, thus ensuring a sufficient length of the intake air passage in the intake pipe 19 within the limited space LS in the automotive vehicle. In contrast, assume that the upstream-side section 5b takes the low port construction the same as the downstream-side section 5a. In this case, the intake pipe 19 will be bent in a shape indicated by a dotted curve 19' in FIG. 6, so that the intake air passage inside the intake pipe is shortened as compared with the case where the upstream-side section 5b takes the high port construction.

Figure 8:
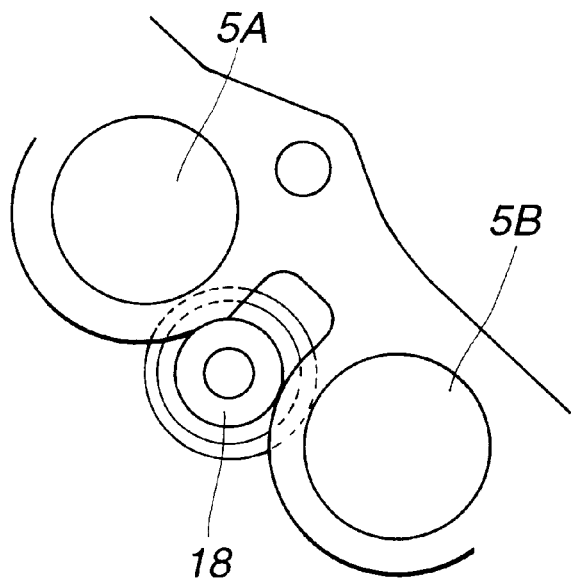
FIG. 8 is an enlarged fragmentary plan view similar to FIG. 7 but showing the same locational relationship in connection with a cylinder head other than that of FIG. 4.

Besides, under the effect of the intake port upstream-side section 5b having the high port construction, the upstream-side section 5b is directed to be separate from the fuel injector valve accommodating hole 18 in which the fuel injector valve 10 is to be accommodated, so that layout and machining of the fuel injector valve accommodating hole 18 can be facilitated. In contrast, assume that the upstream-side section 5b takes the low port construction. In this case, the upstream-side section 5b is directed to approach the fuel injector valve accommodating hole 18 so that they interfere with each other, thus making difficult layout and machining of the fuel injector valve accommodating hole 18, as shown in FIG. 8 (which is an imaginary figure).

While only the cylinder direct injection spark-ignition internal combustion engine has been shown and described, it will be understood that the principle of the present invention may be applicable to other types of internal combustion engines. It is to be noted that it is more effective to apply the principle of the present invention onto a cylinder direct injection spark-ignition internal combustion engine because advantageous effects can be obtained with respect to disposition of a fuel injector valve as discussed above.

What is claimed is:

1. An internal combustion engine, comprising:
   a fuel injector to inject fuel directly into a combustion chamber; and
   a cylinder head having an intake port, said intake port having a first straight section and a second section which are contiguous with each other, said first section being located downstream of said second section relative to flow of intake air, said first and second sections having respectively first and second axes, said first and second axes inclining relative to an intake valve side of a bottom surface of said cylinder head respectively to form first and second angles, said first angle being smaller than said second angle.

2. An internal combustion engine as claimed in claim 1, wherein said first section of said intake port is larger in length than said second section of said intake port.

3. An internal combustion engine as claimed in claim 1, further comprising an intake pipe through which intake air flows to be introduced into said intake port, said intake pipe being connected to said second section of said intake port, said first section being communicable with a combustion chamber.

4. An internal combustion engine as claimed in claim 1, wherein said second section is a straight section.

5. An internal combustion engine as claimed in claim 3, wherein said intake pipe is bent in a circular direction from said second axis in a direction toward an extension of said first axis.

6. An internal combustion engine as claimed in claim 1, wherein said second section is a straight section and wherein, in a plan view, said first section and said second section lie along a straight line.

7. An internal combustion engine as claimed in claim 1, wherein said fuel injector is adjacent to said first section.

8. A cylinder direct injection spark-ignition internal combustion engine, comprising:
   a cylinder block having a plurality of cylinders;
   a cylinder head mounted on a clock deck of said cylinder block, said cylinder head having a first intake port for each cylinder, said intake port having a first straight section and a second section which are contiguous with each other, said first section being located downstream of said second section relative to flow of intake air, said first and second sections having respectively first and second axes, said first and second axes inclining relative to an intake valve side of a bottom surface of said cylinder head respectively to form first and second angles, said first angle being smaller than said second angle;
   a fuel injector to inject fuel directly into a combustion chamber corresponding to each cylinder, said fuel injector being located close to said intake port and disposed closer to a periphery of said combustion chamber than a downstream end of said intake port; and
   a spark plug whose tip end section is projected into the combustion chamber.

9. A cylinder direct injection spark-ignition internal combustion engine as claimed in claim 8, wherein said cylinder head has a second intake port for each cylinder, and first and second exhaust ports for each cylinder, wherein said engine further comprises first and second intake valves by which said first and second intake ports are respectively closable, and first and second exhaust valves by which said first and second exhaust ports are respectively closable.

10. A cylinder direct injection spark-ignition internal combustion engine as claimed in claim 9, further comprising a piston movably disposed in the cylinder to define the combustion chamber between it and said cylinder head, said piston being formed at its piston crown with a generally circular cavity having a center axis which is offset from a center axis of said piston toward said intake valves.

11. A cylinder direct injection spark-ignition internal combustion engine as claimed in claim 10, further comprising a swirl control valve disposed to control air flow in said first intake port in accordance with an engine operating condition.

12. A cylinder direct injection spark-ignition internal combustion engine as claimed in claim 10, wherein said second intake port has an axis wherein at least a major part of said axis is contained in a first vertical plane which inclines relative to a second vertical plane to form a first predetermined angle, the first vertical plane gradually approaching the center axis of said piston in a direction toward the combustion chamber relative to said second vertical plane, the first and second vertical planes being vertical to the block deck of said cylinder block, the second vertical plane passing through said second intake and exhaust valves and being perpendicular to a third vertical plane containing center axes of the cylinders and vertical to the block deck, said second intake and exhaust valves being located respectively on opposite sides of said third vertical plane.

13. A cylinder direct injection spark-ignition internal combustion engine as claimed in claim 10, wherein said fuel injector has an axis which is directed into said circular cavity in the piston crown of said piston, said fuel injector being located between said first and second intake ports on a horizontal plane containing the block deck.

14. A cylinder direct injection spark-ignition internal combustion engine as claimed in claim 12, wherein said first and second intake ports are together located on an opposite side of said third vertical plane with respect to first and second exhaust ports.

15. A cylinder direct injection spark-ignition internal combustion engine as claimed in claim 8, wherein said first section of said intake port is larger in length than said second section of said intake port.

16. A cylinder direct injection spark-ignition internal combustion engine as claimed in claim 12, wherein said first vertical plane is generally tangential to the periphery of said circular cavity.

17. A cylinder direct injection spark-ignition internal combustion engine as claimed in claim 12, wherein said first vertical plane is generally parallel with a fourth vertical plane (V2) containing a tangent line of the periphery of said circular cavity, said fourth vertical plane being vertical to said block deck.

18. A cylinder direct injection spark-ignition internal combustion engine as claimed in claim 9, wherein said fuel injector is located between said first section and said second section.

19. A cylinder direct injection spark-ignition internal combustion engine as claimed in claim 8, wherein said intake pipe is bent in a circular direction from said second axis in a direction toward an extension of said first axis.

\* \* \* \* \*